(12) United States Patent
Qi et al.

(10) Patent No.: US 11,264,169 B2
(45) Date of Patent: Mar. 1, 2022

(54) INSULATION SYSTEM AND CAPACITOR

(71) Applicant: Hitachi Energy Switzerland AG, Baden (CH)

(72) Inventors: Lejun Qi, Beijing (CN); Yang Wang, Beijing (CN); Nan Li, Beijing (CN); Yu Guan, Beijing (CN); Jiansheng Chen, Beijing (CN)

(73) Assignee: Hitachi Energy Switzerland AG, Baden (CH)

( * ) Notice: Subject to any disclaimer, the term of this patent is extended or adjusted under 35 U.S.C. 154(b) by 159 days.

(21) Appl. No.: 16/448,686

(22) Filed: Jun. 21, 2019

(65) Prior Publication Data

US 2019/0311855 A1 Oct. 10, 2019

Related U.S. Application Data

(63) Continuation of application No. PCT/CN2017/000019, filed on Jan. 3, 2017.

(51) Int. Cl.
| | |
|---|---|
| *H01G 4/18* | (2006.01) |
| *H01G 2/14* | (2006.01) |
| *H01G 4/04* | (2006.01) |
| *H01G 4/22* | (2006.01) |

(52) U.S. Cl.
CPC .............. *H01G 4/18* (2013.01); *H01G 2/14* (2013.01); *H01G 4/04* (2013.01); *H01G 4/22* (2013.01)

(58) Field of Classification Search
CPC .................................. H01G 4/14; H01G 4/04
See application file for complete search history.

(56) References Cited

U.S. PATENT DOCUMENTS

| | | | |
|---|---|---|---|
| 4,117,579 A | 10/1978 | Shaw et al. | |
| 4,276,184 A * | 6/1981 | Mandelcorn | ........... H01G 4/221 252/579 |
| 7,974,074 B2 | 7/2011 | Nanba et al. | |
| 10,115,522 B2 | 10/2018 | Qi et al. | |
| 2002/0082673 A1 | 6/2002 | Benz et al. | |
| 2004/0095708 A1 | 5/2004 | Takeda et al. | |

(Continued)

FOREIGN PATENT DOCUMENTS

| | | |
|---|---|---|
| CN | 101341560 A | 1/2009 |
| CN | 101906228 A | 12/2010 |

(Continued)

OTHER PUBLICATIONS

Intellectual Property Office of the P.R. China, International Search Report & Written Opinion issued in corresponding Application No. PCT/CN2017/000019, dated Oct. 11, 2017, 9 pp.

(Continued)

*Primary Examiner* — Eric W Thomas
(74) *Attorney, Agent, or Firm* — Sage Patent Group (57) ABSTRACT

A capacitor insulation system is disclosed in the present application. The insulation system includes a dielectric fluid containing a first voltage stabilizing additive of a first concentration. The insulation system further includes a dielectric film containing the first voltage stabilizing additive of a second concentration and impregnated in the dielectric fluid. The first concentration is greater than the second concentration. The insulation system prepared according to the present disclosure can provide an increased and quite stable dielectric strength.

21 Claims, 4 Drawing Sheets

(56) References Cited

U.S. PATENT DOCUMENTS

| | | |
|---|---|---|
| 2006/0092597 A1 | 5/2006 | Takeda et al. |
| 2009/0103239 A1 | 4/2009 | Feller et al. |
| 2010/0062239 A1 | 3/2010 | Yoshida |
| 2011/0051319 A1 | 3/2011 | Ishikawa et al. |
| 2018/0114642 A1* | 4/2018 | Kakehi ................ B32B 27/30 |

FOREIGN PATENT DOCUMENTS

| | | |
|---|---|---|
| CN | 105793937 A | 7/2016 |
| GB | 1250379 A | 10/1971 |
| GB | 1297802 A | 11/1972 |
| KR | 20100106953 A | 10/2010 |

OTHER PUBLICATIONS

Chinese First Office Action Search Report dated Sep. 25, 2020 for Chinese Patent Application No. 201780076893.X, 4 pages.
Indian Examination Report dated Oct. 14, 2020 for Indian Patent Application No. 201947024997, 5 pages.
Chinese Second Office Action dated Jun. 25, 2021 for Chinese Patent Application No. 201780076893.X, 11 pages (including English translation).

\* cited by examiner

INSULATION SYSTEM AND CAPACITOR

TECHNOLOGY

Example embodiments disclosed herein generally relate to an insulation system, a capacitor and a method of manufacturing a capacitor. More specifically, the embodiments relate to an insulation system for use in a capacitor.

BACKGROUND

Insulation systems have been widely used in applications such as high voltage insulation in electric devices. For example, power capacitors used in electrical applications will usually sustain high voltages, so that a dielectric film of the capacitor is exposed to a certain risk of being broken down. The breakdown of such a dielectric film is irreversible, thus it is important that dielectric performance is guaranteed.

A conventional insulation system for use in a capacitor includes a dielectric fluid and a dielectric film impregnated in the dielectric fluid. Using the dielectric film together with the dielectric fluid as the insulation system provides improved dielectric performance than using the dielectric film solely. However, there is a need in the art for an insulation system of higher dielectric performance.

SUMMARY

Example embodiments disclosed herein propose an insulation system for use in a capacitor, a capacitor incorporating such an insulation system and a method of manufacturing such a capacitor.

In one aspect, example embodiments disclosed herein provide an insulation system for use in a capacitor. The insulation system includes a dielectric fluid containing a first voltage stabilizing additive of a first concentration. The insulation system further includes a dielectric film containing the first voltage stabilizing additive of a second concentration and impregnated in the dielectric fluid. The first concentration is greater than the second concentration.

In one embodiment, the dielectric fluid may further contain at least a second voltage stabilizing additive other than the first voltage stabilizing additive.

In one embodiment, the dielectric film may further contain at least a third voltage stabilizing additive other than the first voltage stabilizing additive.

In one embodiment, the dielectric fluid may include oil.

In one embodiment, the dielectric film may include a polymer material.

In one embodiment, the polymer material may include any selected from a group consisting of polypropylene (PP), polyethylene (PE), crosslinked polyethylene (PEX), polyethylene terephthalate (PET), and polycarbonate (PC), polyethylene naphthalate (PEN), polyphenylene sulfide (PPS), polytetrafluoroethylene (PTFE), polyvinylidene difluoride (PVDF), polyamide (PA), polyimide (PI), polyetherimide (PEI), polyvinyl chloride (PVC), polystyrene (PS), cyanoresins, and copolymers thereof.

In one embodiment, the first voltage stabilizing additive may include an antioxidant.

In one embodiment, the antioxidant may include any selected from a group consisting of chain-terminating primary anti-oxidants and hydroperoxide-decomposing secondary anti-oxidants.

In one embodiment, the first voltage stabilizing additive may include an ultraviolet absorber.

In one embodiment, the UV absorber may include any selected from a group consisting of benzophenone and hindered amine light stabilizer.

In one embodiment, first concentration may be in a range from 1 ppm to 10% by weight.

In one embodiment, the first concentration may be in a range from 10 ppm to 5% by weight.

In one embodiment, the first concentration may be in a range from 10 ppm to 3% by weight.

In one embodiment, the second concentration may be in a range from 1 ppm to 1000 ppm by weight.

In another aspect, example embodiments disclosed herein provide a capacitor including: a first electrode layer; a second electrode layer; and an insulation system described above, the dielectric film is disposed between the first electrode layer and the second electrode layer, and the first electrode layer, the second electrode layer, and the dielectric film are impregnated in the dielectric fluid.

In yet another aspect, example embodiments disclosed herein provide a method of manufacturing a capacitor. The method includes: providing a first electrode layer; providing a second electrode layer; and providing an insulation system described above, the dielectric film is disposed between the first electrode layer and the second electrode layer, and the first electrode layer, the second electrode, and the dielectric film are impregnated in the dielectric fluid.

Through the following description, it would be appreciated that the insulation system produced according to the present disclosure has a high dielectric strength compared with the existing insulation system. Specifically, the addition of the first voltage stabilizing additive into both the dielectric film and the dielectric fluid can improve the dielectric strength of the insulation system. Furthermore, due to the first concentration of the first voltage stabilizing additive in the dielectric fluid being greater than the second concentration of the first voltage stabilizing additive in the dielectric film, immigration of first voltage stabilizing additive out of the dielectric film can be prevented. Thus, the dielectric strength of the insulation system can be increased and quite stable.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DESCRIPTION OF EXAMPLE EMBODIMENTS

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Some values or value ranges might be described in the following. It is to be understood that these values and value ranges are only for the purpose of illustration, which may be advantageous to practice the idea of the subject matter described herein. However, depiction of these examples is not intended to limit the scope of the subject matter described herein in any manner. According to the specific application scenarios and needs, the values or value ranges may be set otherwise.

Figure 1:
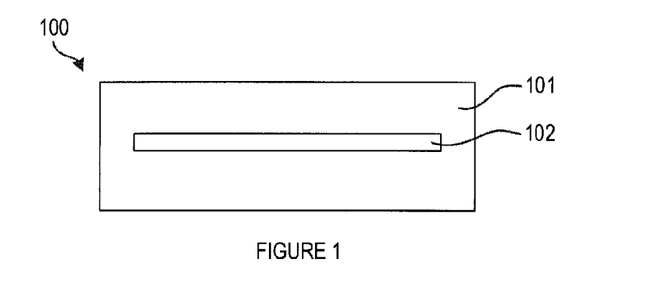
FIG. 1 illustrates a schematic view of an insulation system in accordance with an example embodiment.

FIG. 1 illustrates a schematic view of an insulation system 100 in accordance with an example embodiment. The insulation system 100 is used in a capacitor and includes a dielectric fluid 101 and a dielectric film 102 impregnated in the dielectric fluid 101. Using the dielectric film 102 together with the dielectric fluid 101 as the insulation system 100 provides slightly improved dielectric strength than using the dielectric film 102 solely. In some cases, in order to further improve the dielectric strength of the insulation system 100, voltage stabilizing additives are usually added into the dielectric film 102. However, many voltage stabilizing additives are not stable in the dielectric film 102 and tend to immigrate out of the dielectric film 102, especially at high temperature, which results in that the concentration of the voltage stabilizing additives in the dielectric film 102 is usually quite low.

Embodiments of the present disclosure provide a feasible approach for further improving the dielectric strength of the insulation system 100. In example embodiments, the dielectric fluid 101 contains a first voltage stabilizing additive of a first concentration, and the dielectric film 102 contains the first voltage stabilizing additive of a second concentration. The first concentration is greater than the second concentration. Due to the same first voltage stabilizing additive being contained in the dielectric fluid 101 and the dielectric film 102 and the concentration of the first voltage stabilizing additive in the dielectric fluid 101 being greater than in the dielectric film 102, the first voltage stabilizing additive in the insulation system 100 tends to immigrate from the dielectric fluid 101 to the dielectric film 102. Thus, the first voltage stabilizing additive in the dielectric film 102 is prevented from immigrating to a surface of the dielectric film 102. In this way, the dielectric strength of the dielectric film 102 and thus of the insulation system 100 can be increased and quite stable.

In one embodiment, the dielectric fluid 101 can include oil, such as blend of Monobenzyl toluene and Dibenzyl toluene. For ease of illustration, some embodiments will be described with reference to the blend of Monobenzyl toluene and Dibenzyl toluene. In other embodiments, however, the dielectric fluid 101 may include other materials, such as blend of substituted aromatic hydrocarbons. In short, the material of the dielectric fluid 101 is not to be limited, and any appropriate material with electrical insulation property according to the present disclosure is meant to be protected.

In one embodiment, the dielectric film 102 can include a polymer material, such as polypropylene (PP), and the descriptions are to be given herein particularly for polypropylene. In other embodiments, the dielectric film 102 may include other materials, such as any of polyethylene (PE), crosslinked polyethylene (PEX), polyethylene terephthalate (PET), and polycarbonate (PC), polyethylene naphthalate (PEN), polyphenylene sulfide (PPS), polytetrafluoroethylene (PTFE), polyvinylidene difluoride (PVDF), polyamide (PA), polyimide (PI), polyetherimide (PEI), polyvinyl chloride (PVC), polystyrene (PS), cyanoresins, and copolymers thereof. It is to be understood that the material of the dielectric film 102 is not to be limited, and any appropriate material with electrical insulation property according to the present disclosure is meant to be protected.

In one embodiment, the first voltage stabilizing additive can include an antioxidant and the descriptions are to be given herein particularly for the antioxidant. As an example, the antioxidant may include any of chain-terminating primary anti-oxidants and hydroperoxide-decomposing secondary anti-oxidants. In another embodiment, the first voltage stabilizing additive may include an ultraviolet absorber. As an example, the ultraviolet absorber may include any of benzophenone and hindered amine light stabilizer. In short, the material of the first voltage stabilizing additive is not to be limited, and any appropriate material with electrical insulation property according to the present disclosure is meant to be protected.

In one embodiment, the concentration of the first voltage stabilizing additive in the dielectric fluid 101 may be in a range from 1 ppm to 10% by weight, preferably from 10 ppm to 5% by weight, and further preferably from 10 ppm to 3% by weight. In other embodiments, the concentration of the first voltage stabilizing additive in the dielectric fluid 101 may be higher or lower.

In one embodiment, the concentration of the first voltage stabilizing additive in the dielectric film 102 is in a range from 1 ppm to 1000 ppm by weight. In other embodiments, the concentration of the first voltage stabilizing additive in the dielectric film 102 may be higher or lower, so long as the concentration of the first voltage stabilizing additive in the dielectric fluid 101 is greater than in the dielectric film 102.

In one embodiment, the dielectric fluid 101 may further contain at least a second voltage stabilizing additive other than the first voltage stabilizing additive. That is, the dielectric fluid 101 may contain one or more additional voltage stabilizing additives in addition to the first voltage stabilizing additive. The addition of the second voltage stabilizing additive may further improve the dielectric strength of the insulation system 100. The second voltage stabilizing additive may be of various types. For example, the second voltage stabilizing additive may include any of the materials described above in combination with the first voltage stabilizing additive.

In one embodiment, the dielectric film 102 may further contain at least a third voltage stabilizing additive other than the first voltage stabilizing additive. That is, the dielectric film 102 may contain one or more additional voltage stabilizing additives in addition to the first voltage stabilizing additive. The addition of the third voltage stabilizing additive may further improve the dielectric strength of the insulation system 100. The third voltage stabilizing additive may be of various types. For example, the third voltage stabilizing additive may include any of the materials described above in combination with the first voltage stabilizing additive. In some implementations, the second voltage stabilizing additive may be of the same material as the third voltage stabilizing additive. In other implementations, the second voltage stabilizing additive may be of different material from the third voltage stabilizing additive.

Figure 2:
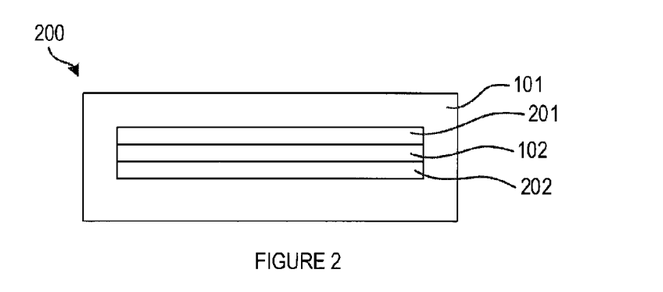
FIG. 2 illustrates a schematic view of a capacitor in accordance with an example embodiment.

FIG. 2 illustrates a schematic view of a capacitor 200 incorporating the insulation system 100 described above. As shown, the capacitor 200 includes a first electrode layer 201, a second electrode layer 202, a dielectric film 102 and a dielectric fluid 101. The dielectric film 102 is disposed between the first electrode layer 201 and the second electrode layer 202. The first electrode layer 201, the second electrode layer 202, and the dielectric film 102 are impregnated in the dielectric fluid 101. The capacitor 200 includes the insulation system 100 described above and thus can provide the similar advantages. For example, the dielectric strength of the insulation system 100 can be increased and quite stable.

Figure 3:
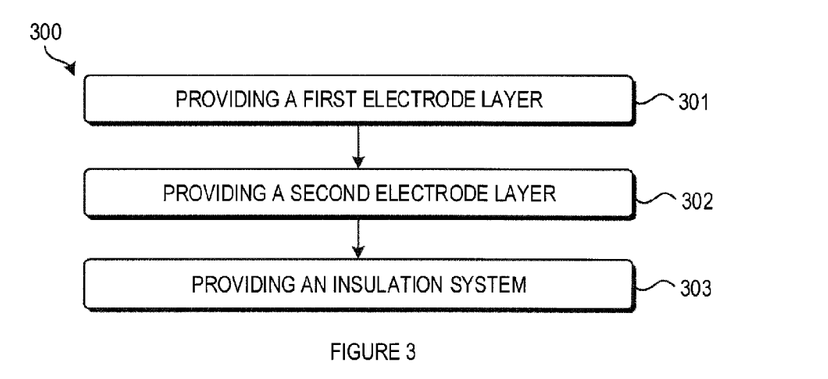
FIG. 3 illustrates a process of manufacturing a capacitor in accordance with an example embodiment.

FIG. 3 illustrates a process 300 of manufacturing the capacitor 200 in accordance with an example embodiment. At block 301, a first electrode layer is provided. At block 302, a second electrode layer is provided. At block 303, an insulation system described above is provided. The dielectric film is disposed between the first electrode layer and the second electrode layer. The first electrode layer, the second electrode layer, and the dielectric film can be rolled so as to be encapsulated or packaged within a housing. The dielectric fluid is accommodated in the housing, so that the first electrode layer, the second electrode layer, and the dielectric film are impregnated in the dielectric fluid. It is to be understood that all the features described with reference to FIGS. 1 and 2 are applicable to the method 300 and will not be repeated herein.

Figure 4:
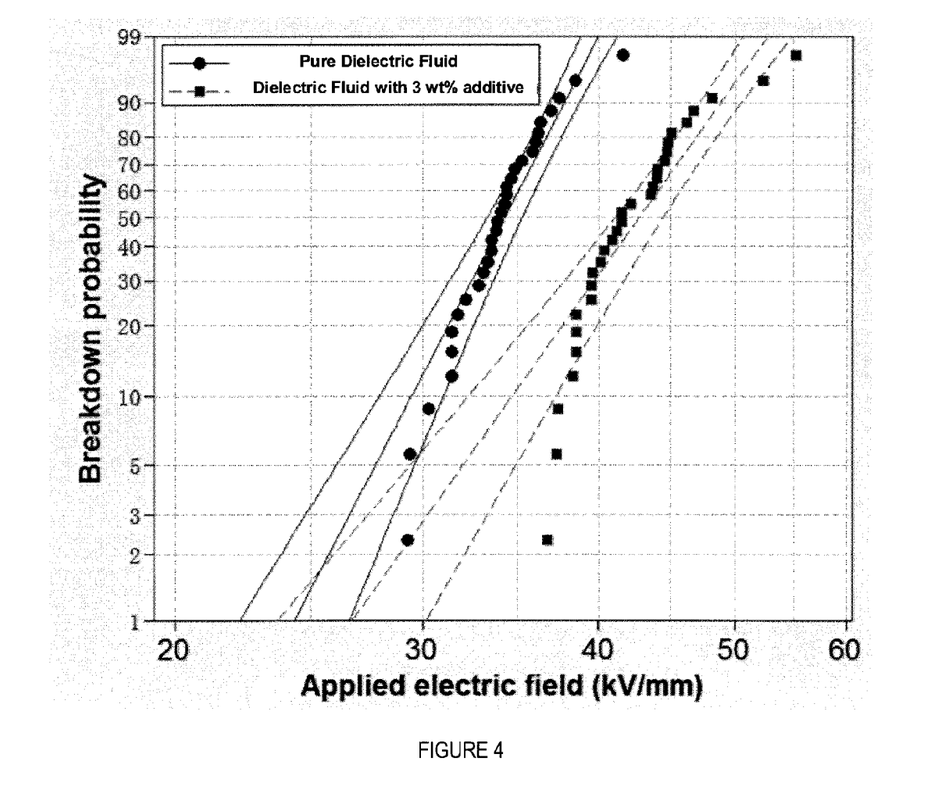
FIG. 4 is a graph showing AC breakdown probability of dielectric fluids along applied electric field.
Figure 5:
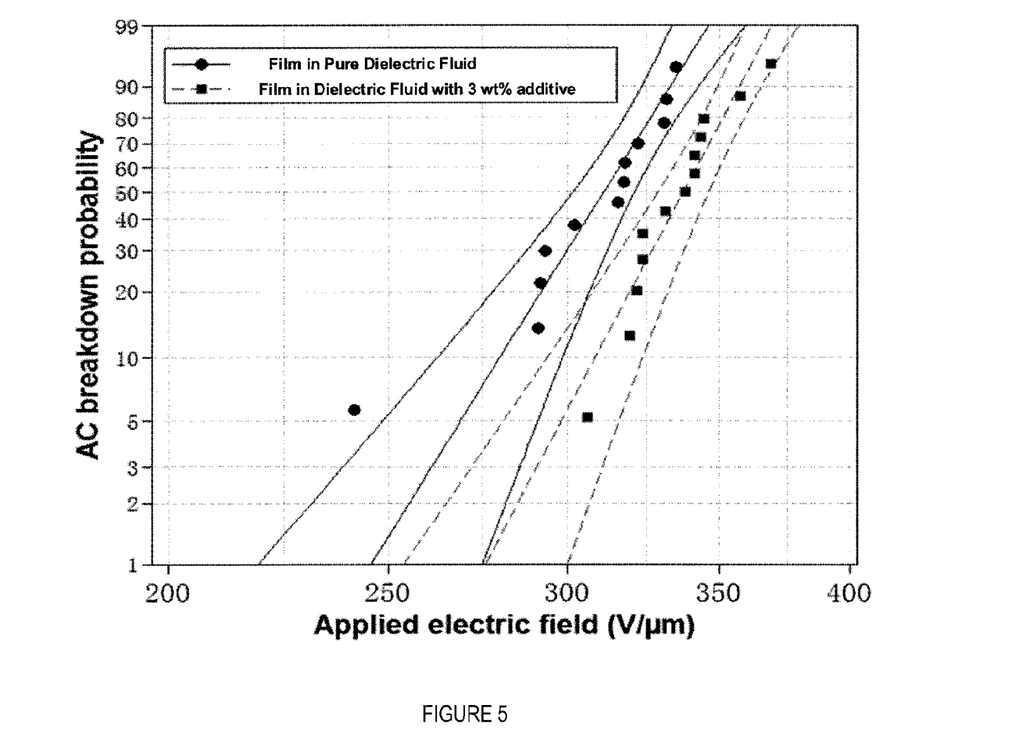
FIG. 5 is a graph showing AC breakdown probability of insulation systems along applied electric field.
Figure 6:
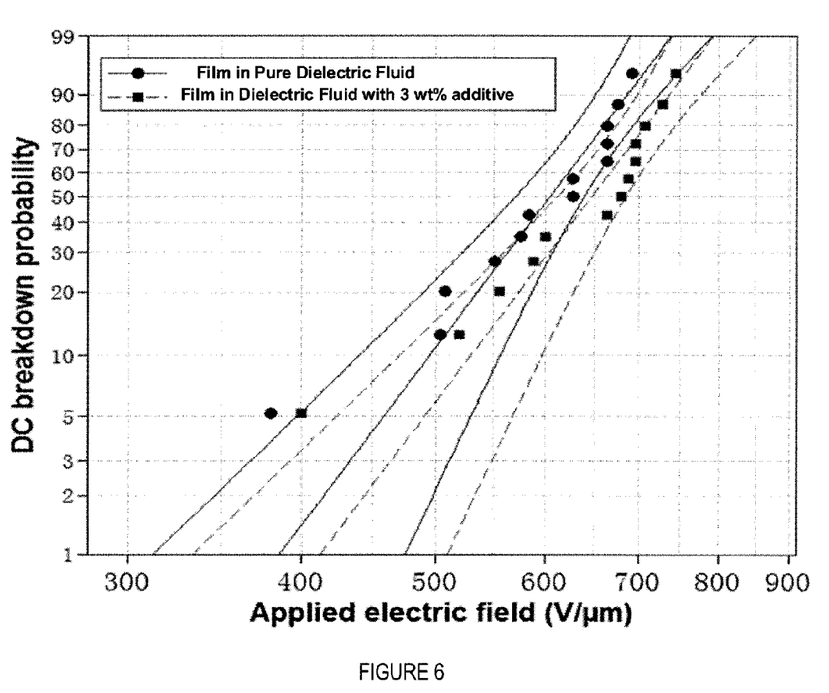
FIG. 6 is a graph showing DC breakdown probability of insulation systems along applied electric field.

Hereinafter, the dielectric performance of the insulation system 100 will be described with reference to the experimental results as shown in FIGS. 4-6. In the experimental environment, the dielectric fluid 101 includes blend of Monobenzyl toluene and Dibenzyl toluene, the dielectric film 102 includes polypropylene, the first voltage stabilizing additive in the dielectric fluid 101 and the dielectric film 102 includes an antioxidant, the concentration of the antioxidant in the dielectric film 102 is 100 ppm by weight, and the concentration of the antioxidant in the dielectric fluid 101 is 3% by weight.

FIG. 4 is a graph showing AC breakdown probability of dielectric fluids along applied electric field. Breakdown tests of dielectric fluids are performed according to IEC standard 60156 with an electrode gap of 1 mm at room temperature. Some experimental results as shown in FIG. 4 are provided in Table 1 below. As shown in FIG. 4 and Table 1, if the dielectric fluid 101 does not contain the antioxidant, the AC dielectric strength of the dielectric fluid 101 is about 34.1±2.7 kV/mm and the Weibull α is 35.4 kV/mm. If the concentration of the antioxidant in the dielectric fluid 101 is 3% by weight, the AC dielectric strength of the dielectric fluid 101 is about 42.5±4.3 kV/mm and the Weibull α is 44.6 kV/mm. Thus, the AC dielectric strength of the dielectric fluid 101 is improved by about 26.0% through adding the antioxidant into the dielectric fluid 101. That is, AC breakdown probability of the dielectric fluid 101 containing the antioxidant will be much lower than that of the dielectric fluid 101 without any voltage stabilizing additive under the same AC electric field.

TABLE 1

| Formulation | | | | | |
|---|---|---|---|---|---|
| Monobenzyl toluene + Dibenzyl toluene | Antioxidant | AC dielectric strength (kV/mm) | Weibull α (kV/mm) | Weibull β | Δα |
| 100 wt % | 0 | 34.1 ± 2.7 | 35.4 | 12 | — |
| 97 wt % | 3 wt % | 42.5 ± 4.3 | 44.6 | 9 | 26.0% |

FIG. 5 is a graph showing AC breakdown probability of insulation systems along applied electric field, and FIG. 6 is a graph showing DC breakdown probability of insulation systems along applied electric field. Some experimental results as shown in FIGS. 5 and 6 are provided in Table 2 below. Bi-axial oriented polypropylene (BOPP) films with a thickness of 10 μm are impregnated in the dielectrics fluids at 70° C. for about 100 hours before testing. Breakdown tests of the swelled BOPP films are performed in the dielectric fluids with a voltage ramp rate of 250 V/s for both AC and DC voltage sources. The ground and high-voltage electrodes are both aluminum foils with an electrode area of ~2.5 cm².

As shown in FIG. 5 and Table 2, if the dielectric film 102 includes two layers and the dielectric fluid 101 does not contain the antioxidant, the average AC dielectric strength of the insulation system 100 is about 299.1±40.3 kV/mm and the Weibull α is 313.6 kV/mm. If the dielectric film 102 includes two layers and the concentration of the antioxidant in the dielectric fluid 101 is 3% by weight, the average AC dielectric strength of the insulation system 100 is about 328.1±32.8 and the Weibull α is 343.6 kV/mm. Thus, the AC dielectric strength of the insulation system 100 is improved by about 9.6% through adding the antioxidant into the dielectric fluid 101 and the dielectric film 102. That is, AC breakdown probability of the insulation system 100 containing the antioxidant will be much lower than that of the insulation system 100 without any voltage stabilizing additive under the same AC electric field.

As shown in FIG. 6 and Table 2, if the dielectric film 102 includes one layer and the dielectric fluid 101 does not contain the antioxidant, the average DC dielectric strength of the insulation system 100 is about 593.8±89.8 kV/mm and the Weibull α is 628.4 kV/mm. If the dielectric film 102 includes one layer and the concentration of the antioxidant in the dielectric fluid 101 is 3% by weight, the average DC dielectric strength of the insulation system 100 is about 636.0±98.8 and the Weibull α is 673.6 kV/mm. Thus, the DC dielectric strength of the insulation system 100 is improved by about 7.2% through adding the antioxidant into the dielectric fluid 101 and the dielectric film 102. That is, DC breakdown probability of the insulation system 100 containing the antioxidant will be much lower than that of the insulation system 100 without any voltage stabilizing additive under the same DC electric field.

TABLE 2

| | Fluid formulation | Average BDV (V/μm) | Weibull α (V/μm) | Weibull β | Δα |
|---|---|---|---|---|---|
| AC Breakdown (2-layer films) | Pure dielectric fluid | 299.1 ± 40.3 | 313.6 | 15 | — |
| | Dielectric fluid with 3 wt % antioxidant | 328.1 ± 32.8 | 343.6 | 21 | +9.6% |
| DC Breakdown | Pure dielectric fluid | 593.8 ± 89.8 | 628.4 | 10 | — |

TABLE 2-continued

| | Fluid formulation | Average BDV (V/μm) | Weibull α (V/μm) | Weibull β | Δα |
|---|---|---|---|---|---|
| (1-layer film) | Dielectric fluid with 3 wt % antioxidant | 636.0 ± 98.8 | 673.6 | 10 | +7.2% |

While operations are depicted in a particular order in the above descriptions, this should not be understood as requiring that such operations be performed in the particular order shown or in sequential order, or that all illustrated operations be performed, to achieve desirable results. In certain circumstances, multitasking and parallel processing may be advantageous. Likewise, while several details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A capacitor insulation system, comprising:
a dielectric fluid containing a first voltage stabilizing additive of a first concentration; and
a dielectric film containing the first voltage stabilizing additive of a second concentration, wherein the dielectric film is impregnated in the dielectric fluid, and the first concentration of the first voltage stabilizing additive is greater than the second concentration of the first voltage stabilizing additive for increasing a dielectric strength of the insulation system.

2. The capacitor insulation system according to claim 1, wherein the dielectric fluid further contains at least a second voltage stabilizing additive other than the first voltage stabilizing additive.

3. The capacitor insulation system according to claim 1, wherein the dielectric film further contains at least a third voltage stabilizing additive other than the first voltage stabilizing additive.

4. The capacitor insulation system according to claim 1, wherein the dielectric fluid includes oil.

5. The capacitor insulation system according to claim 1, wherein the dielectric film includes a polymer material.

6. The capacitor insulation system according to claim 5, wherein the polymer material includes any selected from a group consisting of polypropylene (PP), polyethylene (PE), crosslinked polyethylene (PEX), polyethylene terephthalate (PET), and polycarbonate (PC), polyethylene naphthalate (PEN), polyphenylene sulphide (PPS), polytetrafluoroethylene (PTFE), polyvinylidene difluoride (PVDF), polyamide (PA), polyimide (PI), polyetherimide (PEI), polyvinyl chloride (PVC), polystyrene (PS), cyanoresins, and copolymers thereof.

7. The capacitor insulation system according to claim 1, wherein the first voltage stabilizing additive includes an antioxidant.

8. The capacitor insulation system according to claim 7, wherein the antioxidant includes any selected from a group consisting of chain-terminating primary anti-oxidants and hydroperoxide-decomposing secondary anti-oxidants.

9. The capacitor insulation system according to claim 1, wherein the first voltage stabilizing additive includes an ultraviolet absorber.

10. The capacitor insulation system according to claim 9, wherein the ultraviolet absorber includes any selected from a group consisting of benzophenone and hindered amine light stabilizer.

11. The capacitor insulation system according to claim 1, wherein the first concentration is in a range from 1 ppm to 10% by weight.

12. The capacitor insulation system according to claim 11, wherein the first concentration is in a range from 10 ppm to 5% by weight.

13. The capacitor insulation system according to claim 12, wherein the first concentration is in a range from 10 ppm to 3% by weight.

14. The capacitor insulation system according to claim 1, wherein the second concentration is in a range from 1 ppm to 1000 ppm by weight.

15. A capacitor, including:
a first electrode layer;
a second electrode layer; and
an insulation system including a dielectric fluid containing a first voltage stabilizing additive of a first concentration and a dielectric film containing the first voltage stabilizing additive of a second concentration, wherein the dielectric film is impregnated in the dielectric fluid, and the first concentration of the first voltage stabilizing additive is greater than the second concentration of the first voltage stabilizing additive for increasing a dielectric strength of the insulation system; and
wherein the dielectric film is disposed between the first electrode layer and the second electrode layer, and the first electrode layer, the second electrode layer, and the dielectric film are impregnated in the dielectric fluid.

16. The capacitor according to claim 15, wherein the dielectric fluid further contains at least a second voltage stabilizing additive other than the first voltage stabilizing additive.

17. The capacitor according to claim 16, wherein the dielectric film further contains at least a third voltage stabilizing additive other than the first voltage stabilizing additive.

18. The capacitor according to claim 15, wherein the first voltage stabilizing additive includes an ultraviolet absorber.

19. The capacitor according to claim 15, wherein the first concentration is in a range from 1 ppm to 10% by weight; and
wherein the second concentration is in a range from 1 ppm to 1000 ppm by weight.

20. A method of manufacturing a capacitor, including:
providing a first electrode layer;
providing a second electrode layer; and
providing an insulation system including a dielectric fluid containing a first voltage stabilizing additive of a first concentration, and
a dielectric film containing the first voltage stabilizing additive of a second concentration, wherein the dielectric film is impregnated in the dielectric fluid, and the first concentration of the first voltage stabilizing additive is greater than the second concentration of the first voltage stabilizing additive for increasing a dielectric strength of the insulation system; and wherein the dielectric film is disposed between the first electrode layer and the second electrode layer, and the first electrode layer, the second electrode layer, and the dielectric film are impregnated in the dielectric fluid.

21. A method for increasing dielectric strength of a capacitor, including:

providing a first electrode layer;

providing a second electrode layer; and providing an insulation system, the insulation system including:

a dielectric fluid containing a first voltage stabilizing additive of a first concentration; and a dielectric film containing the first voltage stabilizing additive of a second concentration and wherein the dielectric film is impregnated in the dielectric fluid, and the first concentration of the first voltage stabilizing additive is greater than the second concentration of the first voltage stabilizing additive for increasing the dielectric strength of the insulation system;

wherein the dielectric film is disposed between the first electrode layer and the second electrode layer, and the first electrode layer, the second electrode, and the dielectric film are impregnated in the dielectric fluid.

* * * * *